Patented Oct. 25, 1927.

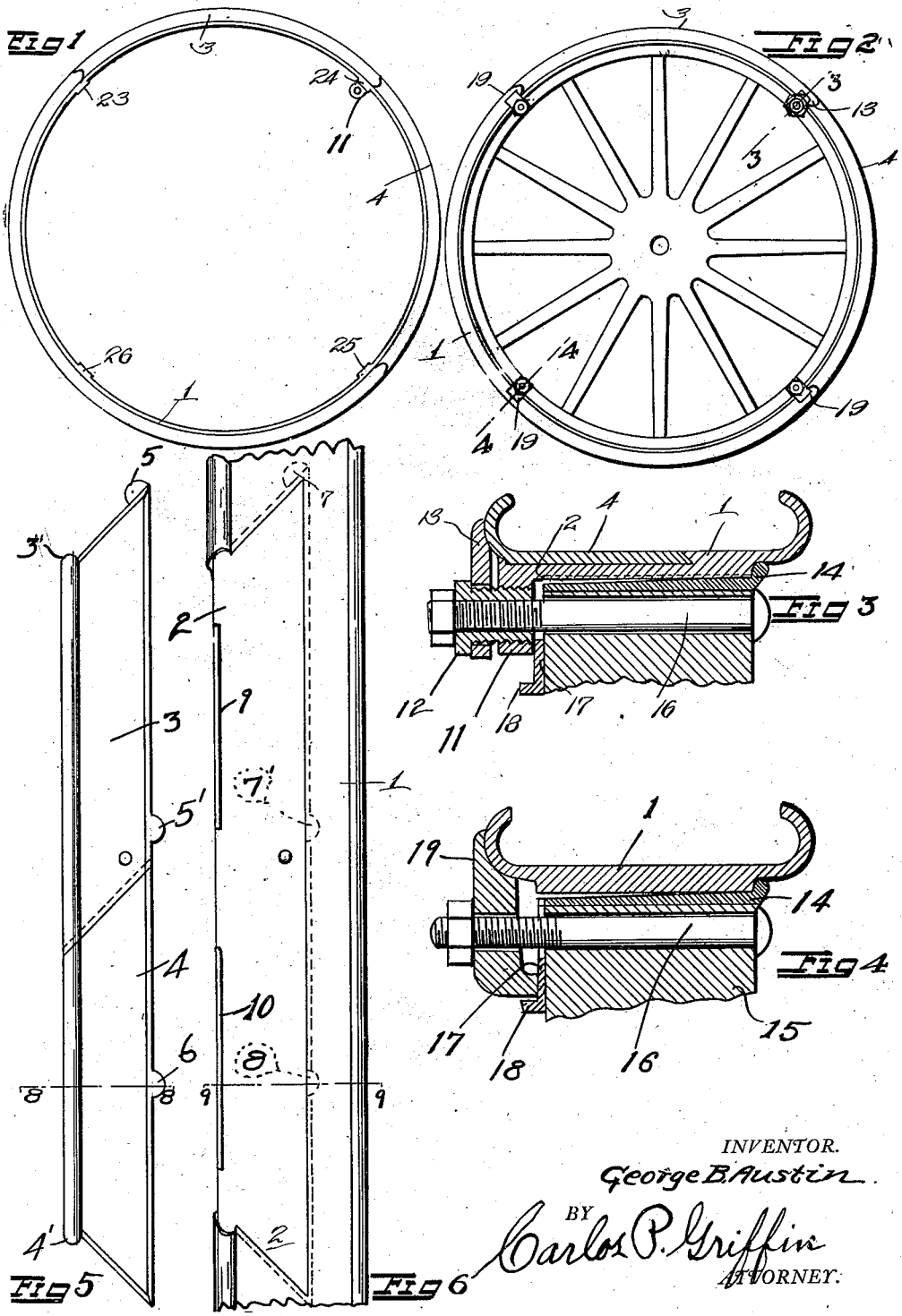

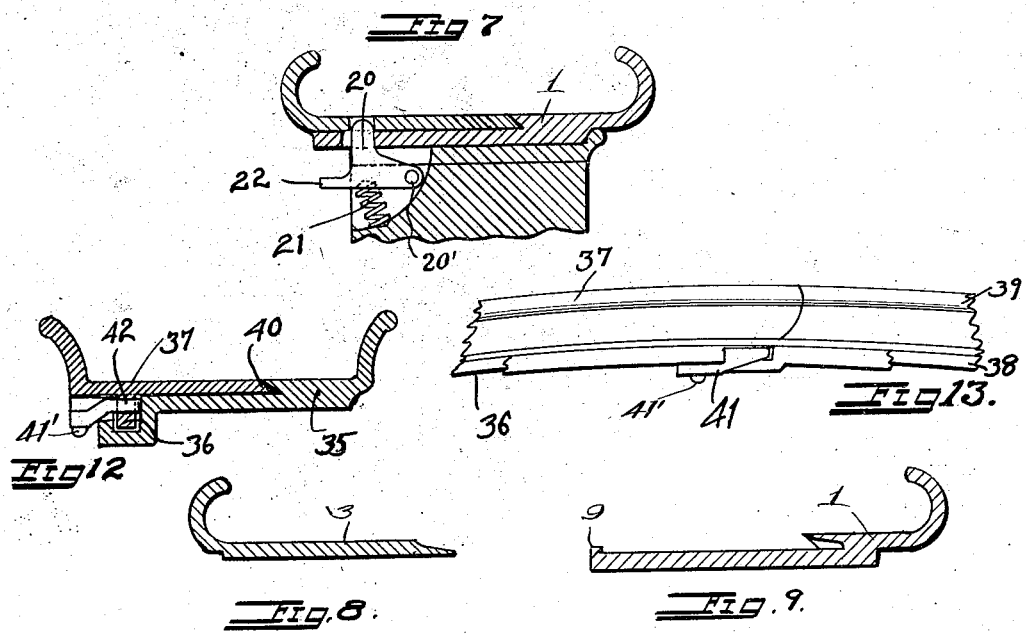
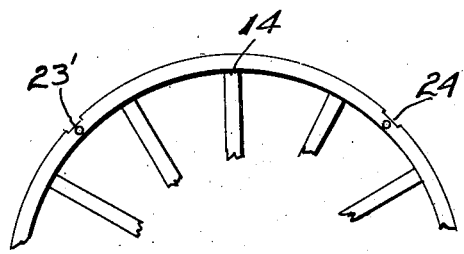
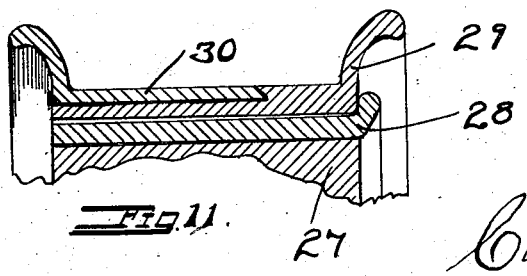

1,646,677

UNITED STATES PATENT OFFICE.

GEORGE B. AUSTIN, OF JUNGO, NEVADA.

DEMOUNTABLE RIM FOR TIRES.

Application filed October 29, 1923. Serial No. 671,294.

This invention relates to a demountable wheel rim for pneumatic tires, and its object is to provide means whereby either clincher or straight side tires, with cable base beads, may be easily placed on the rim without distorting them, or disturbing the tube and liner strip used to cover the gap between the tire beads.

Another object of the invention is to produce a tire rim which may be disassembled for the placing of the tire, or for its removal, which will have only one bolt to hold the detachable parts in place.

Another object of the invention is to provide a securing device for the detachable parts of the rim which can also be used for securing the rim against rotation when on the wheel, as well as for securing it in place thereon.

It will also be understood by those skilled in the art that while only one form of clincher rim and straight side rim is shown that there are a number of rims having different cross sections to which this invention may be applied.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the rim as it appears unmounted, the tubular locking bolt being removed, Fig. 2 is a side elevation of a wheel having this rim applied thereto, the locking nuts being shown in place, Fig. 3 is a sectional view of the wheel and rim on line 3—3, Fig. 2, Fig. 4 is a sectional view of the wheel and rim on the line 4—4, Fig. 2, Fig. 5 is a developed plan view of the two removable sections of the rim, Fig. 6 is a developed plan view of the rim at the recess for the removable sections, Fig. 7 is a sectional view of the wheel rim at the snap lock for holding the rim in place, until the bolts are tightened, Fig. 8 is a sectional view of one of the removable members of the rim, Fig. 9 is a sectional view of the part of the rim complementary to the part shown in Fig. 8, Fig. 10 is a view of a portion of the wheel felloe and spokes of the wheel showing the recesses for holding the rim lugs, and Figure 11 is a cross sectional view of a rim with the modified form of detachable rim section shown in Figure 7. Figure 12 is a transverse sectional view of a modified form of locking device used with a rim section similar to that of Figure 7, and Figure 13 is a side elevation of a portion of a tire rim with the locking device illustrated in Figure 12.

The main body section of the rim is illustrated at 1 and may be of any desired type for holding either clincher or straight side tires. The rim section has a recessed portion with a back 2, adapted to receive and seat the two detachable sections 3 and 4; each detachable section 3 and 4 has its inner edge and its outer end beveled to interlock with the main body section 1, when resting upon the back section 2, the adjacent ends of the two members 3 and 4 being beveled to interlock with each other as illustrated at the central part of Figure 5. The detachable sections of the rim have lugs, as shown at 5 5' and 6 to aid in interlocking them with the main rim section 1, said lugs fitting into recesses 7, 7' and 8 in the body section of the rim. The back 2 has two raised flanges 9 and 10, over which the detachable sections may be moved into place and which aid in locking the detachable sections 3 and 4 in place when the tire is inflated.

The rim section 1 has a lug 11 depending therefrom into which is threaded a tubular bolt 12 for the purpose of locking the two detachable members 3 and 4 in place, a large washer 13 being used to hold the end of the member 3 against the end of the member 4. The ends 3', 4' are cut on a reverse bevel to overlap the adjacent flanged ends of the rim section 1.

The felloe band is indicated at 14 and it is held on the felloe 15, partly because it is shrunk thereon as is usual with tires, and also by means of the four bolts 16. These bolts have threaded washers 17 each with a lug 18 on one edge to form a seat for certain of the rim holding lugs 19 through which the bolts 16 pass. In order to hold the rim in place when first placed on the tire, and to aid in locking it in place there is a transverse recess in the wheel felloe 15 to receive a latch 20 which latch is pivoted on pin 20' in the felloe and has a spiral spring 21 to cause it to move into the opening of the tire rim as shown in Fig. 7.

The end 22 of the latch projects so it can be used to disengage the latch from the rim whenever necessary.

In order to prevent the rim from creeping it has four lugs 23, to 26, which project into corresponding recesses of the felloe band, as indicated at 23', 24'.

In the form of the invention shown in Fig. 11 the felloe is indicated at 27, the felloe band at 28, the main body of the rim at 29, and the detachable section at 30. This is operated exactly like the other rim but has straight sides instead of clincher beads.

It will be seen that the detachable members have their edges and ends so tapered as to fit into recesses in the body of the rim, and since the base of the tire is inextensible, they will be securely held in place when once the tire is inflated.

The section 4 may be placed in position first, then section 3 to complete the rim.

In practice the rim may have a tire replaced without removing it from the wheel or may be carried as a demountable with an extra inflated tire by means of the usual bracket.

The detachable parts of the rim extend about one-half its periphery and make it possible to put the tire into place on the rim without disturbing the inner flap or tube in any way, and make it much easier to apply and remove a tire than where a transversely split rim is used.

In the form of the invention shown in Figs. 12 and 13, the fixed portion of the rim section is indicated at 35, and is provided, for a portion of its length, with a groove to receive a bead 36 on detachable member 37, while the same groove also receives the bead 38 of the detachable member 39. The detachable members 37, 39 have their inner edges beveled to fit into an oppositely beveled groove in the main body of the rim, as indicated at 40, and the member 37 also overlaps the member 39 sufficiently to hold it in place, and it is itself locked in place by means of a pivoted latch 41 which has a tongue 42 capable of passing into a hole in the rib 36 at a place where that rim bead 36 is slightly widened. The latch 41 rotates outwardly to disengage its end 42 from the bead 36 on an axis radial to the rim; the rivet holding it in place being indicated at 41' which rivet is fixed in the section 35 of the rim.

It will be understood by those skilled in the art that cable base tires are practically inextensible and fit the rim tightly so that when once the two members 37, 39 are pushed into place, the ribs 36, 38 will be pushed into the groove which receives them, with some little force, and as soon as the tire is expanded, those ribs will prevent the dislodgement of the two detachable members in exactly the same way as the ribs 9 and 10 in the other form of the invention prevent the dislodgment of the two detachable members 3 and 4. It is, of course, to be understood that in actual operation upon the wheel of the vehicle the lugs 19 insure against accidental dislodging of the two detachable members.

What I claim is as follows, but modifications may be made in carrying out the invention shown in the drawings and in the above particularly described form thereof, within the purview of the invention, as defined by the annexed claim:

A demountable rim for tires comprising a main body section having two removable sections on one side thereof, lugs on said removable sections adapted to fit into recesses in the main body section, and raised flanges on the open edge of said main body section over which said removable sections are adapted to be moved into place to aid in locking a tire in place when said tire is inflated.

In testimony whereof I have hereunto set my hand this 13th day of October A. D. 1923.

GEORGE B. AUSTIN.